W. P. AUSTIN.
Water-Trap for Waste-Pipes.
No. 208,139. Patented Sept. 17, 1878.
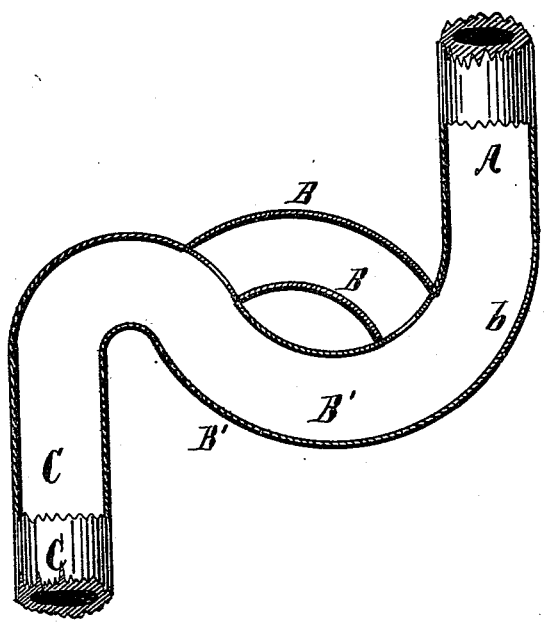
Witnesses:
F. Birkitt,
Richard Gerner
Inventor:
William P. Austin
Per:
Henry Gerner,
Att'y.

UNITED STATES PATENT OFFICE.

WILLIAM P. AUSTIN, OF NEW YORK, N. Y.

IMPROVEMENT IN WATER-TRAPS FOR WASTE-PIPES.

Specification forming part of Letters Patent No. 208,139, dated September 17, 1878; application filed March 4, 1878.

*To all whom it may concern:*

Be it known that I, WILLIAM P. AUSTIN, of the city, county, and State of New York, have invented a new and useful Improvement in Water-Traps for Waste-Pipes; and I hereby declare the following to be a full and clear description of the same.

The nature of this invention consists in providing two branches for the trap, so as to avoid the emptying of the trap of its sealing-water by an induction-current, or flow of air and water down the main soil or waste pipe, (into which the trap empties,) occasioned by the discharge through the said soil or waste pipe of the water and deposits from an upper level.

The nature of the invention will be readily understood by reference to the accompanying drawing, which represents a sectional elevation of the improved soil-pipe and trap.

The pipe A, which is to be attached in the usual manner to any closet, sink, basin, or other fixture, is connected by means of a trap having two branches, B B', with the outlet-pipe C.

It frequently occurs that the outlet-pipe C is attached to a contiguous vertical soil or waste pipe, having branches and connections in upper stories, from the discharging contents of which a strong induced current is created in the main pipe, and in a similar manner to the induced currents created by the well-known principle of the Giffard injector for feeding steam-boilers. This induced current of air is sometimes sufficient to empty the lower traps of their sealing-water, and thus prevents their action as traps at all, and thereby creates grave sanitary evils, which it is the office of my two-way siphon-trap to obviate.

If with this trap, by reason of a current through the down-pipe, as above described, a current of air should be drawn through the outlet-pipe C with sufficient force to empty any ordinary trap of its sealing-water, with the present arrangement the current of air would be drawn through the upper leg, B, of the trap, leaving the water (filling or sealing water) retained in the lower leg, B', of the trap, where the water would settle by reason of its specific gravity being greater than the air. In this way the suction or induced current will press through the upper passage, B, of the trap, and as soon as its influence shall have ceased the retained water in the lower pipe, B', will again settle down, so as to seal the trap at the point *b*.

Having described my invention, I claim—

The trap-pipe A C, connected by two trap-siphons, B and B', arranged one above the other, and connected at their extremities, as and for the purpose set forth and described.

WILLIAM P. AUSTIN.

Witnesses:
F. BARRITT,
CH. RIEGELMAN.